Figure 1:
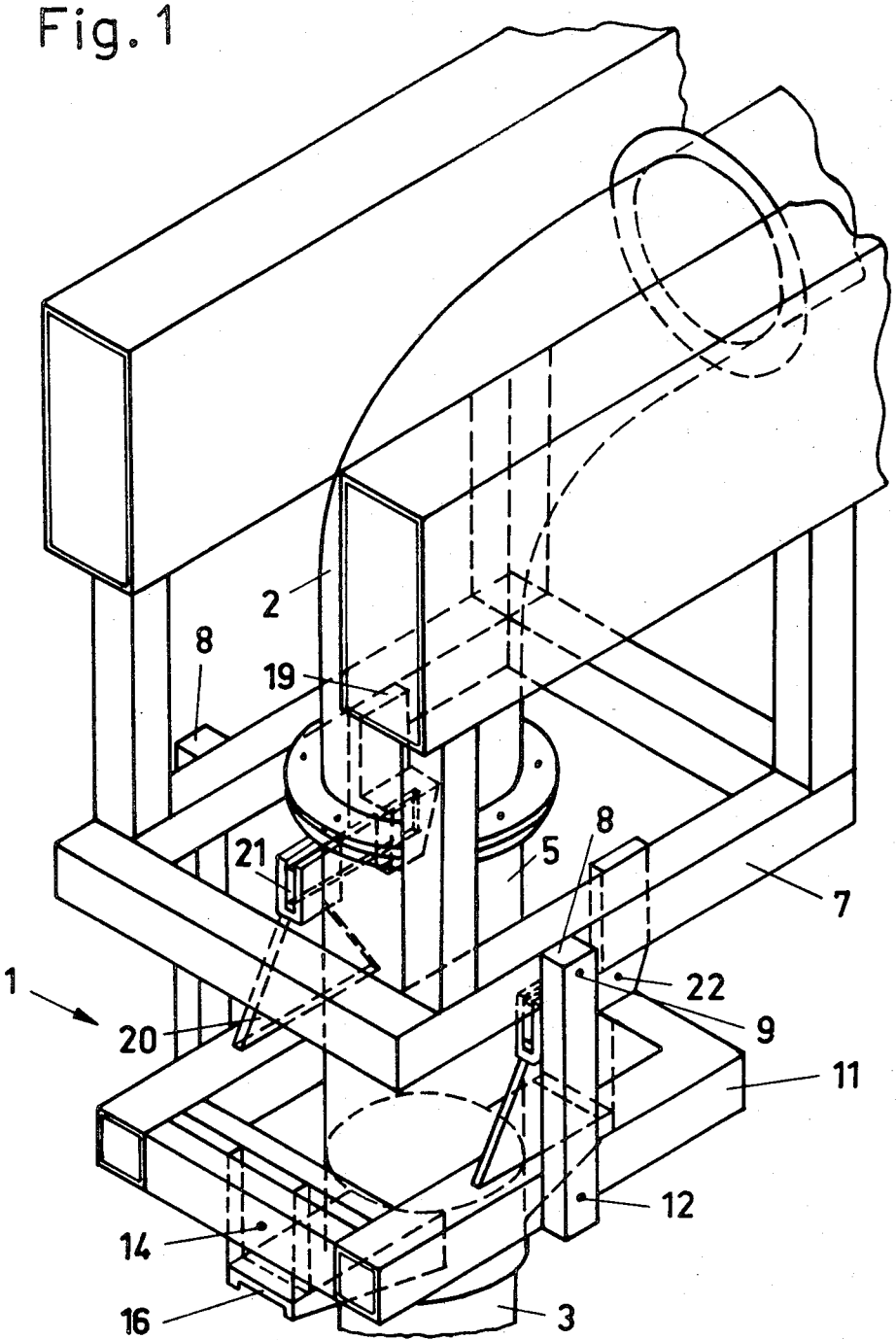

United States Patent [19]
Abderhalden

[11] 3,826,524
[45] July 30, 1974

[54] FLEXIBLE CONNECTION FOR CONVEYING PIPES

[75] Inventor: Johann Heinrich Abderhalden, Dietikon, Switzerland

[73] Assignee: Swiss Aluminium Ltd., Chippis, Switzerland

[22] Filed: Dec. 18, 1972

[21] Appl. No.: 316,349

[30] Foreign Application Priority Data
Dec. 21, 1971 Switzerland.................... 18772/71

[52] U.S. Cl.................... 285/61, 285/114, 285/182
[51] Int. Cl.............................................. F16l 3/00
[58] Field of Search............. 285/61, 181, 182, 184, 285/45, 114; 302/64

[56] References Cited
UNITED STATES PATENTS

| | | | |
|---|---|---|---|
| 512,558 | 1/1894 | Landis | 285/182 X |
| 522,758 | 7/1894 | Landis | 285/181 X |
| 568,537 | 9/1896 | Laubsch | 285/184 X |
| 970,956 | 9/1910 | Ruddell | 285/182 X |
| 1,946,760 | 2/1934 | Rhine | 285/182 X |
| 2,643,680 | 6/1953 | Kaiser | 251/181 X |

FOREIGN PATENTS OR APPLICATIONS
735,253  5/1943  Germany............................. 302/64

*Primary Examiner*—Alfred R. Guest
*Attorney, Agent, or Firm*—Ernest F. Marmorek

[57] ABSTRACT

A flexible connection for use between two pipes of a suction conduit to convey gritty substances, the angle between the two pipes being variable, comprises a frame pivoted to one pipe about a first axis transverse to the central axis of one pipe, a carrier spaced apart from the frame fixed in relation to the other pipe, means interconnecting the frame and the carrier, said means being pivoted to the frame and to the carrier on substantially parallel second axes, the pivot axis between the said interconnecting means and the frame being substantially perpendicular to the first axis, an articulated conduit portion including a series of annular members articulated together and a flexible hose surrounding said annular members and connected to said two pipes.

7 Claims, 4 Drawing Figures exchange for a new hinge

FLEXIBLE CONNECTION FOR CONVEYING PIPES

The present invention relates to a flexible pipe connection, especially for connection of a riser pipe with a conveyor pipe of a suction device.

Flexible pipe connections are known, for example, on a suction device for unloading of ships, between a substantially vertical riser pipe for sucking the material out of the hold, and a conveyor pipe connected onto it at an angle. The conveyor pipe of such a suction device is in most cases supported on a bracket which can swing about a horizontal axis, and at the free end of the bracket the conveyor pipe is connected pivotally to a vertically suspended riser pipe. In such suction devices, in which the angle between both riser and conveyor pipes will vary according to the inclination of the conveyor pipe, use has been made of ball and socket pipe joints, arranged between the riser pipe and the conveyor pipe, or of flexible conveyor hoses together with a pipe hinge which can swing about an axis. These known connection systems however appear as being very susceptible to derangement, in particular they undergo a relatively great wear by the conveyed material, and thus must often be exchanged for a new hinge or a new hose.

In the ball and socket pipe connections there is particularly the difficulty of seating and sealing one ball half with respect to the other ball half, in order that, during the relatively large and often one-sided loading that arises, no damage of the seating occurs, from which injury or even destruction of the sealing between the two ball halves could arise. Furthermore a pipe hinge which can swing around an axis, and which is incorporated in the ball and socket joints, produces, in conjunction with a relatively small deflection radius, a very abrupt deflection of the material which, during the conveyor operation, exerts an abrasive action. Thus, even by use of very wear-resistant material, destruction of the pipe hinge already occurs after a relatively short time.

It is an object of the present invention to provide a flexible pipe joint, especially between the riser pipe and conveyor pipe of a suction device for unloading of powdery or granular material from storage spaces, which avoids the defects of the previously known pipe joints.

According to the instant invention a flexible connection for use between two pipes of a suction conduit to convey gritty substances comprises in combination a frame pivoted to the one pipe about an axis transverse to the central axis of the said one pipe, a carrier spaced apart form the said frame and fixed in relation to the other pipe, means interconnecting the frame and the carrier, said means being pivoted to the frame and to the carrier on substantially parallel second axes, the pivot axis between the said interconnecting means and the frame being substantially perpendicular to the said first axis, an articulated conduit portion including a series of annular members articulated together, and a flexible hose surrounding said annular members and connected to said two pipes.

This flexible pipe connection is especially advantageous for insertion in suction devices for unloading of relatively large quantities from storage spaces, because it permits the riser pipe to be swung in any desired direction or into any part of the storage space, and the pipe connection, in comparison with former ones, shows a relatively great resistance to wear, from which results a reduced likelihood of derangement.

Figure 2:
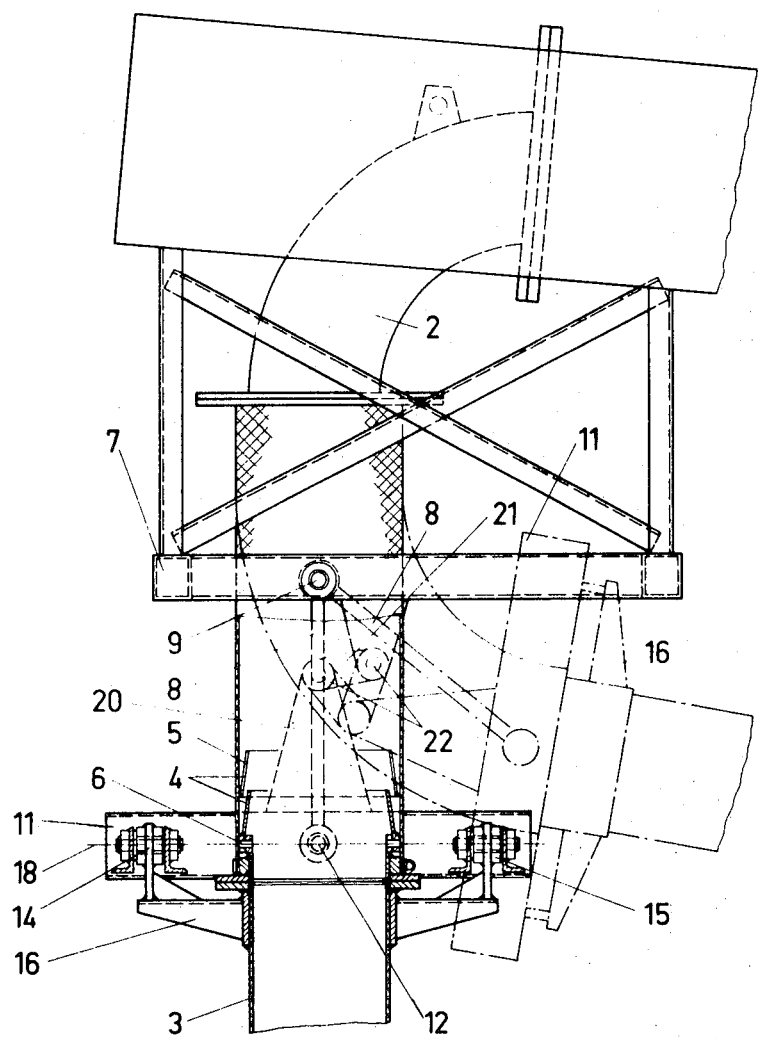
Figure 3:
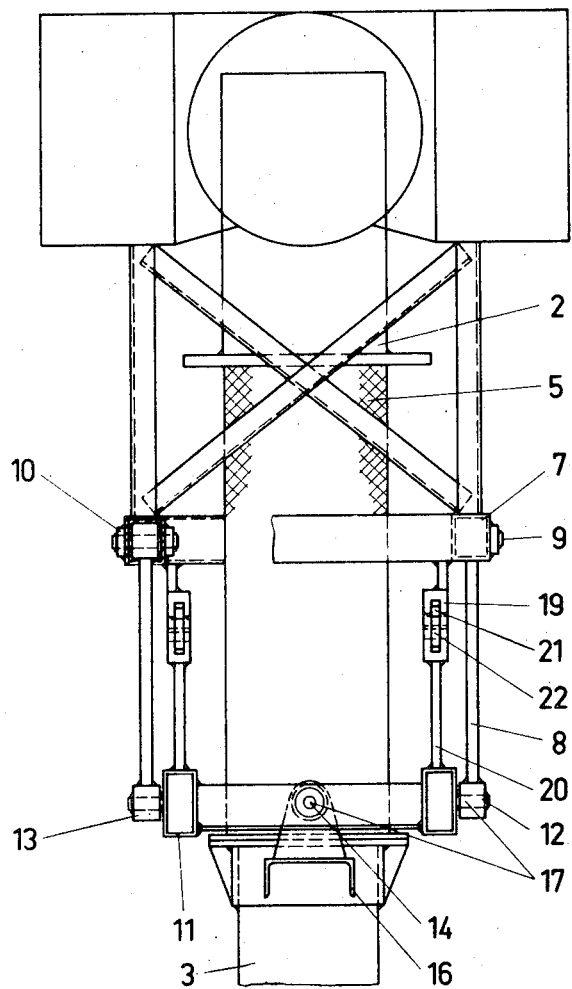

The accompanying drawings show by way of example an embodiment of the invention. In these drawings:

FIG. 1 is a diagrammatic perspective view;
FIG. 2 is a side elevation, partly in section;
FIG. 3 is an end elevation; and
FIG. 4 is an enlarged vertical central section through the articulated pipe, in curved condition.

The flexible pipe connection 1 is part of a suction device, not shown in more detail, and is connected on the one hand with a conveyor pipe 2 and on the other hand with a riser pipe 3. By means of the riser pipe 3 the material to be conveyed is sucked out of a container or storage space of a ship not further shown. For the sake of simplicity the conveyor pipe is shown as fixed, while in FIG. 2 the riser pipe is shown in broken lines swung away into a substantially horizontal position, although in reality the riser pipe hangs down substantially vertically from the free end of the bracket supporting the conveyor pipe 2, while the conveyor pipe is inclinable about a horizontal axis not shown in more detail.

Figure 4:
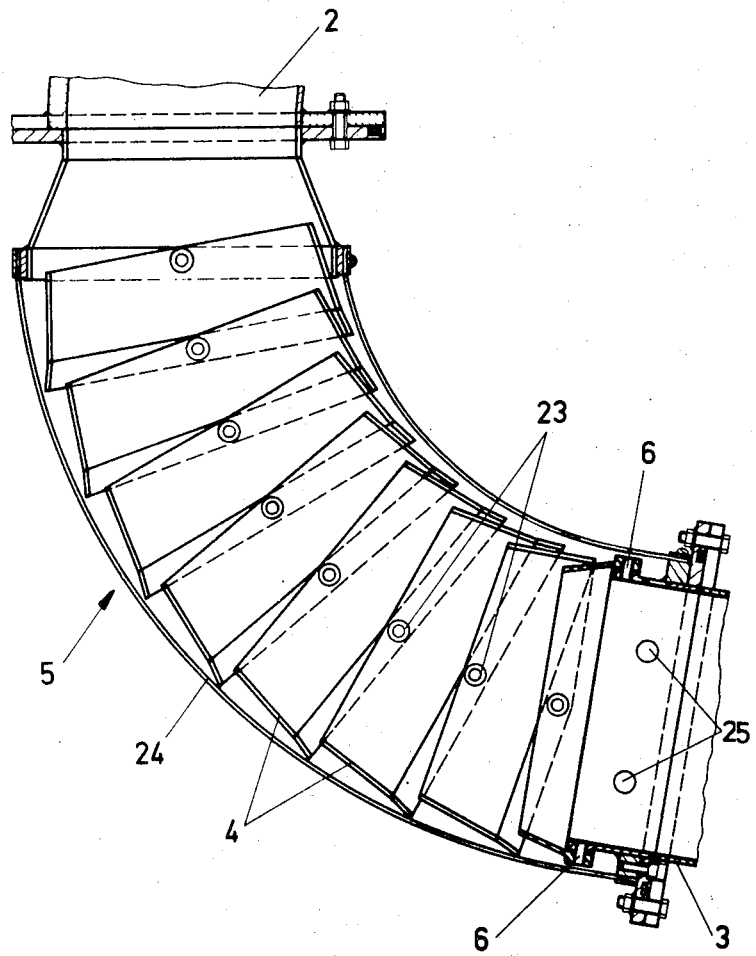

As shown more in detail in FIG. 4, an articulated conduit portion 5, consisting of individual annular members 4 which are interconnected by pivot bearings 23 having parallel axes, is connected to the conveyor pipe 2 and to the riser pipe 3. The riser pipe 3 is pivoted to the lower end annular member of the articulated conduit portion 5, in order to swing about bearings 6 having an axis transverse to the swinging plane of the articulated conduit portion. The upper end annular member of the articulated conduit portion 5 is fixed by flanges to the conveyor pipe 2.

The articulated conduit portion 5 is surrounded by a carrier 7, which is fastened to a bracket carrying the conveyor pipe 2. This carrier lies somewhat below the lower end of the conveyor pipe 2. On the carrier 7, two bars 8 acting as interconnecting means are supported on bearings 9, 10, having a common axis, so as to be able to swing in planes parallel to the swinging plane of the articulated conduit portion 5. At the lower end of the bars 8, a frame 11 is pivoted to the bars on bearings 12, 13. On the frame 11 there are also pivot bearings 14, 15 having an axis substantially perpendicular to the axis of the bearing 12, 13. A support 16, fixed to the riser pipe 3, is journalled to swing on the bearings 14, 15, so that, by means of the bearings 12, 13 and 14, 15 arranged transversely to one another, a universal joint 17 is formed. The first annular member 4 of the articulated conduit portion 5 is, as already mentioned, pivotally connected with the riser pipe 3 through bearings 6, which are suitably arranged coaxial to the bearings 14 and 15 on the frame 11, by which means the riser pipe 3, together with the support 16, is inclinable in relation to the first ring 4 around a common theoretical axis 18.

Arms 19, 20 respectively are fixed on the carrier 7, and on the frame 11, on both sides of the articulated conduit portion 5. These arms are connected together at their outer ends by levers 21 and pivots 22. This arrangement serves, in co-operation with the bars 8, to control the position of the riser pipe 3 as it swings, so that the articulated pipe 5 is enabled to deflect into a uniformly extending curve over its entire length.

As shown in FIG. 4, the individual annular members 4 of the articulated conduit portion 5 are connected pivotally together by pairs of bearings 23 arranged diametrically to each other, to incline about theoretical axes extending parallel to one another. The axis of the bearings 6 for the riser pipe 3 is arranged transverse to the bearings 23 of the articulated conduit portion 5. The annular members 4 of the conduit portion 5 are surrounded by a hose 24 of resistant, flexible material, which is fixed on the one hand to the conveyor pipe 2, via the upper end annular member of the conduit portion 5, and on the other hand to the riser pipe 3. It thus tightly closes off the articulated conduit portion 5 from the external atmosphere.

The upper end of the riser pipe 3, which is covered by the end part of the hose 24 and connected pivotally with the first annular member 4 of the conduit portion 5, has through holes 25 connecting the interior of the riser with the space between the conduit portion 5 and the hose 24. Any of the conveyed material which reaches the space between the hose 24 and the end of the riser pipe can re-enter the riser pipe through these holes. Material reaching this space between the annular members and the hose 24 is automatically conveyed into the articulated conduit portion 5 through the openings between the annular members 4. The external flexible rubber hose 24 is protected by the rings and undergoes no wear by the conveyed material during conveying.

In comparison with connection system formed from annular members which can incline about theoretical axes extending alternatively transversely to one another, the flexible connection as described above presents the advantage of only half the constructional length, for a predetermined range of swinging. The flexible pipe connection 1 remains in some extend universal, even in the deflected condition, and is especially advantageous when arranged between a riser pipe lying substantially in the vertical position and a conveyor pipe of a suction device extending at a variable inclination to it, because on the one hand the weight of the riser pipe 3 is carried by the bearings 9, 10, 12, 13 and 14, 15 arranged between it and the free end of the bracket carrying the conveyor pipe 2, and on the other hand the guiding device 19 to 22 associated with the flexible pipe connection 1 enables the articulated pipe 5 to deflect in a uniformly extending curve, so that wear within the connection by the deflected stream of material is kept down.

The use of the flexible pipe connection 1 is not restricted only to a suction device having a riser pipe 3. It is, for example, also possible to connect in this way two pipes of a conveyor device which have to be moved in an horizontal plane so that the angle between them may be varied, because here also the advantageous deflection of the conveyed stream in a uniform curve is ensured.

What I claim is:

1. A flexible connection for use between two pipes of a suction conduit to convey gritty substances, the angle between the two pipes being variable,
comprising in combination,
a frame pivoted to one pipe about a first axis transverse to the central axis of said one pipe,
a carrier spaced apart from the frame fixed in relation to the other pipe,
means interconnecting the frame and the carrier, said means being pivoted to the frame and to the carrier on substantially parallel second axes, the pivot axis between the said interconnecting means and the frame being substantially perpendicular to said first axis, and
an articulated conduit portion including a series of annular members articulated together and a flexible hose surrounding said annular members and connected to said two pipes.

2. A connection according to claim 1, in which the said frame is pivoted to a support fixed to the one pipe.

3. A connection according to claim 1, including arms fixed respectively on the carrier and on the frame, on both sides of the articulated conduit portion, said arms being interconnected at their outer ends by levers and pivots.

4. A connection according to claim 1 in which an end annular member of the articulated conduit portion is connected with the one pipe through pivots arranged coaxial to the pivot axis between the said frame and the said one pipe.

5. A connection according to claim 4, in which the end of the one pipe which is pivotally connected with the first annular member of the articulated conduit portion is surrounded by the end part of the hose, and has through holes connecting the interior of the said one pipe with the space between the articulated conduit portion and the hose.

6. A connection according to claim 1, in which the axes of the pivots bearings interconnecting the individual annular members of the articulated conduit portion are substantially parallel to the pivot axes of the means interconnecting the frame and the carrier.

7. A connection according to claim 1, in which the hose is of resistant, flexible material, and is fixed at both ends to the one and the other pipe respectively and thus closes off the articulated conduit portion tightly from the outer atmosphere.

* * * * *